Figure 1:
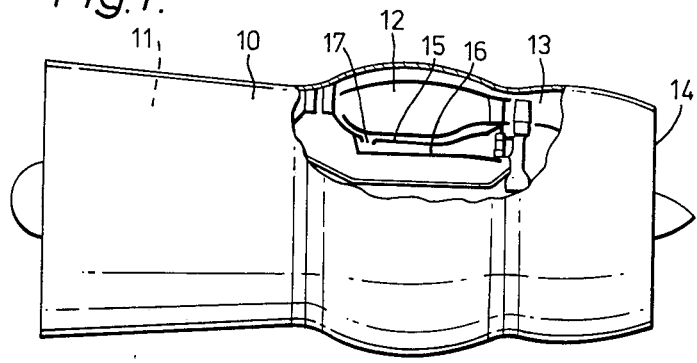

United States Patent [19]

Davies

[11] 4,265,590
[45] May 5, 1981

[54] COOLING AIR SUPPLY ARRANGEMENT FOR A GAS TURBINE ENGINE

[75] Inventor: David O. Davies, Duffield, England

[73] Assignee: Rolls-Royce Limited, London, England

[21] Appl. No.: 38,707

[22] Filed: May 14, 1979

[30] Foreign Application Priority Data

May 20, 1978 [GB] United Kingdom ............... 20951/78

[51] Int. Cl.³ ............................................... F02G 7/18
[52] U.S. Cl. .................................. 415/110; 415/115
[58] Field of Search ............... 415/115, 116, 110, 175; 416/90, 92, 95, 96, 97

[56] References Cited

U.S. PATENT DOCUMENTS

| | | | |
|---|---|---|---|
| 2,685,429 | 8/1954 | Auyer | 415/110 |
| 2,988,325 | 6/1961 | Dawson | 415/115 |
| 3,437,313 | 4/1969 | Moore | 415/115 |
| 3,533,712 | 10/1970 | Kercher | 416/97 |
| 3,635,586 | 1/1972 | Kent et al. | 415/115 |
| 3,989,410 | 11/1976 | Ferrari | 415/115 |
| 4,103,899 | 8/1978 | Turner | 415/175 |

FOREIGN PATENT DOCUMENTS

1476237 6/1977 United Kingdom ..................... 416/95

Primary Examiner—Louis J. Casaregola
Attorney, Agent, or Firm—Cushman, Darby & Cushman

[57] ABSTRACT

A cooling air supply arrangement for a gas turbine engine comprises a rotor, a source of cooling air at a high supply pressure, a first passage adapted to transmit a first flow of said cooling air to a first area of the rotor and to reduce its pressure to a first pressure lower than said high supply pressure, and a second passage adapted to transmit a second flow of said cooling air to a second area of the rotor and to reduce its pressure to a second pressure lower than the first pressure. A seal is provided to resist flow of cooling air from said first to said second area, and in order to reduce the leakage through the seal it incorporates part of the second passage including nozzles oriented to direct at least part of said second flow against the leakage flow. In this way the leakage is reduced and simultaneously the pressure of the second flow is reduced.

8 Claims, 3 Drawing Figures

COOLING AIR SUPPLY ARRANGEMENT FOR A GAS TURBINE ENGINE

This invention relates to a cooling air supply arrangement for a gas turbine engine.

Gas turbine engines are frequently provided with cooled turbines and other sections. The cooling is normally provided by the supply of cooling air from the compressor of the engine to the area concerned. It is sometimes advantageous to divide this cooling air into two portions at differing pressures, these two portions being applied to different areas of a rotor divided from one another by seal means.

Such a cooling system is exemplified by that described in our prior UK patent 1282142 (U.S. Pat. No. 3635586).

Obviously the seal between these two areas is a potential source of loss of efficiency, and the present invention provides a construction in which the efficiency of the seal may be improved without significant complication of the structure, or alternatively a simpler seal may be designed to produce a similar efficiency.

According to the present invention, a cooling air supply arrangement for a gas turbine comprises a rotor, a source of cooling air at a high supply pressure, first passage means adapted to supply a first flow of said cooling air to a first area of the rotor and to reduce its pressure to a first pressure lower than the high supply pressure, second passage means adapted to supply a second flow of said cooling air to a second area of said rotor and to reduce its pressure to a second pressure lower than the first pressure, and sealing means adapted to resist the flow of cooling air at said first pressure from said first to said second area, said sealing means incorporating part of said second passage means in which at least part of said second flow of cooling air is directed to flow against the leakage flow in the sealing means so as to reduce said leakage flow and simultaneously to reduce the pressure of said second flow of cooling air.

If necessary, the whole of the lower pressure air is caused to flow against the leakage flow so as to reduce the leakage or alternatively only part of the air may be used in this way, the remainder being fed through suitable separate nozzles to said second area.

In one embodiment the rotor is a turbine rotor and the cooling air is fed to the rotor so as eventually to reach the blades which are supported by the rotor.

Figure 2:
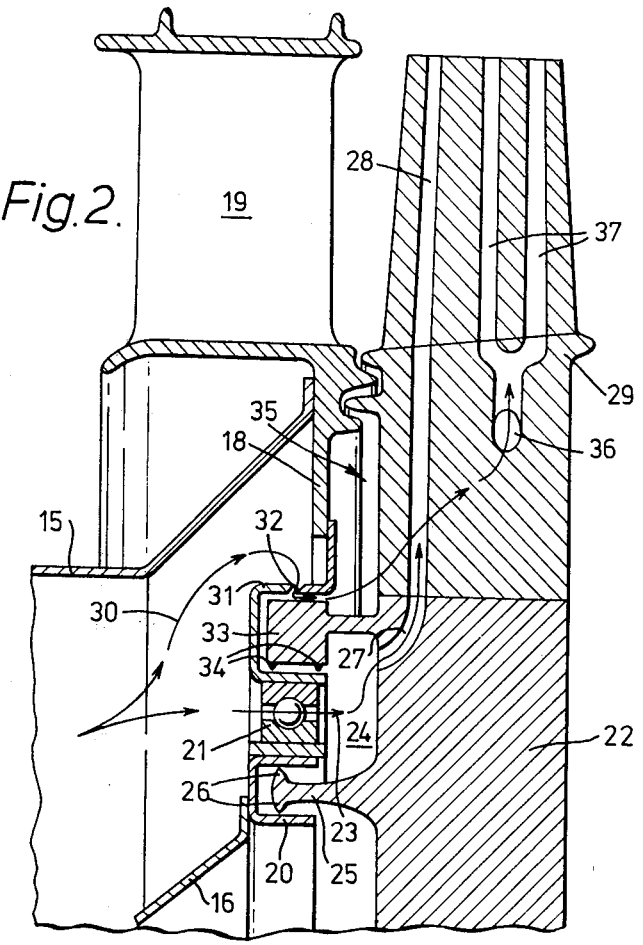
Figure 3:
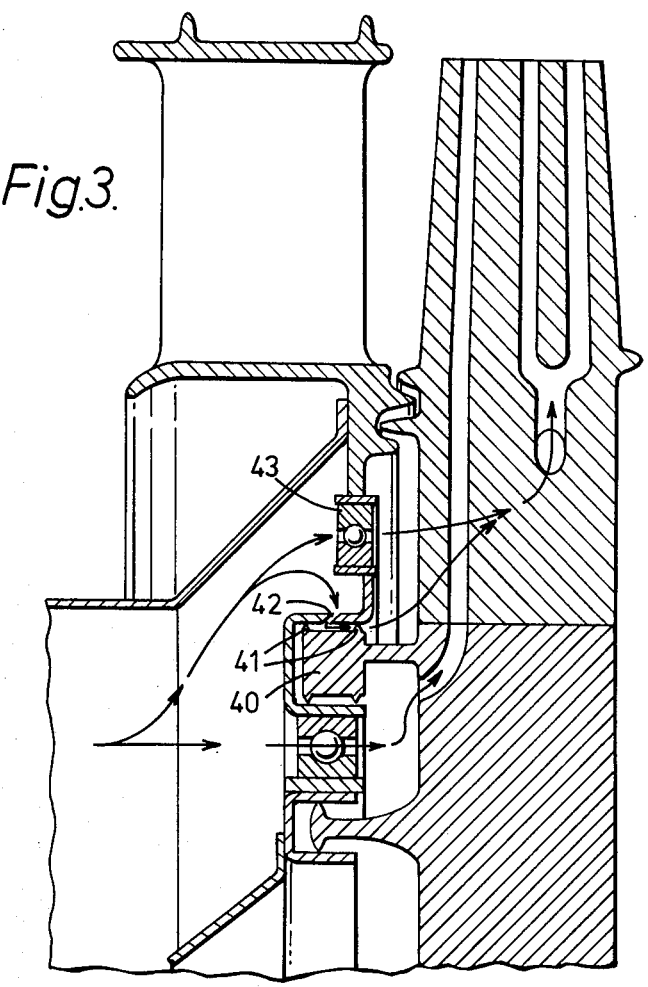

In the invention will now be particularly described, merely by way of example, with reference to the accompanying drawings in which:

FIG. 1 is a partly broken away side view of a gas turbine engine including a cooling air flow arrangement in accordance with the invention, FIG. 2 is an enlarged section through the turbine area in which is incorporated the cooling air arrangement of the invention, and FIG. 3 is a view similar to FIG. 2 but of a second embodiment.

In FIG. 1 there is shown a gas turbine engine comprising a casing 10 within which are supported a compressor 11, a combustion section 12 and turbine 13. The casing 10 forms at its downstream end a propulsion nozzle 14. Operation of the engine overall is conventional in that air is taken into the compressor 11, compressed and fed to the combustion section 12 where it is mixed with fuel and burnt. The hot gases thus produced drive the turbine 13 which in turn drives the compressor 11. The residual gases are passed through the nozzle 14 to provide propulsive thrust.

Because of the high temperatures attained by the gases in the combustion system 12 it is necessary to provide cooling for the turbine 13 on which the hot gases impinge. In the present instance this cooling is effected by bleeding high pressure air from the delivery end of the compressor 11. As can be seen in FIG. 1 the inner casing 15 of the combustion systems 12 and a further casing 16 mounted inside the casing 15 provide an annular channel through which air may flow from an aperture 17 which allows air to bleed from the inner wall of the combustion area 12.

In FIG. 2 can be seen in greater detail the arrangements by which the high pressure supply of cooling air is delivered to the turbine. The inner casing 15 of the combustion system is attached to a flange 18 which in this embodiment extends from the nozzle guide vanes 19. The second inner casing 16 is connected through an annular seal channel 20 to a ring of swirler devices 21 which are arranged to cause the cooling air flowing from between the casings 15 and 16 to have an angular velocity which is similar to that of the turbine disc 22. The arrows 23 indicate this flow of cooling air. The nozzles or swirlers 21 may comprise separate vanes or a cascade of vanes. The swirlers 21 and the dimensions of the various passages involved are so arranged that the pressure of air delivered through this first passage means to the first annular area 24 adjacent the disc 22 is adequately high to feed the more critical areas of the blade cooling system, but it is substantially lower than the high supply pressure which is that at the downstream end of the compressor 11.

An annular sealing flange 25 projects from the disc 22 and has seal fins 26 which engage with the channel 20 to substantially prevent inward leakage of this air from the annular space.

This cooling air which has passed through the swirlers 21 enters a series of passages 27 in the disc 22 and hence is passed into cooling passages 28 formed in each of the turbine blades 29.

A second portion of the high pressure supply of cooling air which flows inbetween the casings 15 and 16 flows as indicated by arrows 30 to a location radially outside that of the swirlers 21. An extension 31 from the flange 18 is provided with nozzles such as angled slots 32 forming second passage means through which the cooling air passes. It will be seen that the extension 31 extends to the outer edges of the swirlers 21 and forms an annular chamber within which extends a sealing flange 33 from the disc 22. Sealing fins 34 from the flange 33 engage with the structure 31 to form a conventional fin type seal.

The area outside this seal and enclosed between the flange 18, the extension 31 and the blades 29 comprises a second annular space 35 into which the cooling air from the slots 32 is allowed to flow. The pressure of the air in the space 35 is arranged, by judicious choice of the size and angle of the passages 32, to be less than that in the space 24. Therefore the seal fins 34 have to provide, in conjunction with the flange 33, a seal which prevents or at least reduces leakage from space 24 to space 35.

However, as is well known in the art these mechanical seals are subject to problems of manufacturing tolerances and wear in service, and there is consequently a danger that the seal will not be as efficient as might be desired. Therefore the nozzles such as slots 32 are angled in such a direction as to cause the flow of cooling air to have a component of motion in opposition to that of the leakage flow through the seal. In this way the flow of cooling air opposes the leakage flow and improves the efficiency of the seal before it flows into annular space 34.

It will be noted that the overall pressure ratio between the space between casings 15 and 16 and the space 35 is considerably greater than that between the spaces 24 and 35 and it is this difference in pressure ratios which enables the slots 32 to act as an efficient aerodynamic seal.

The cooling air flow from space 35 then enters the blades 29 through apertures 36 formed in the flanks of the root extensions of these blades. These apertures 36 allow the air to flow into a system of passages 37 to cool this lower pressure part of the blade.

It will be seen therefore that the boundary between the higher pressure and lower pressure cooling air areas (the first and second areas) which are formed by the seal 33 and the structure 31 is improved in efficiency by using the flow of air 30 through these slots 32. Since the air flowing through these slots is required for subsequently cooling the blades in any case, using the air to improve the seal does not impose an additional penalty on the air flow of the engine. By enabling the seal 33 to be made more simple an improvement in cost and weight may be achieved, or alternatively by using the slots 32 in conjunction with an already efficient seal it may be possible to obtain higher efficiencies in the operation of the seal. Depending on the particular engine cycle and configuration, there may be sufficient pressure available to preswirl the cooling air passing through the slots 32 by incorporating suitable shallow swirl vanes in the slots. In addition, although as shown the outer surface of the rotating seal element 33 is indicated as a plain diameter, the system will also operate by having the slots 32 feeding inbetween two suitable fins formed on this element. An embodiment in which this system is used is shown in FIG. 3.

The majority of the structure of FIG. 3 is identical with that of FIG. 2 and the description of FIG. 3 is therefore limited to those features where there is a difference. It will be seen that in FIG. 3 the seal member 40 which corresponds to the seal member 33 of FIG. 2, is provided with a pair of annular seal fins 41 which extend from its outer surface. This may be compared with the plain cylindrical outer surface of the seal 33. The nozzles such as slots 42 which equate to the slots 32 of FIG. 2 allow that part of the cooling air flowing through them to enter the seal between the fins 41.

The second difference lies in the provision of an annular array of nozzles such as swirlers 43 in the flange 44 which corresponds to the flange 18 of FIG. 2. The swirlers 43 allow air to pass into the space 45 which is the equivalent of 35 in FIG. 2. It will be understood that only part of the air flows into the space 45 flows through the slots 42; the remainder, which may form the majority, will pass through the swirlers 43. Obviously this embodiment will depend upon the relatively smaller amount of air flowing through the slots 42 being able to produce the necessary improved efficiency of the seal 40.

Although described above in particularly convenient embodiments, it will be appreciated that the invention could be used in other applications. Thus its use is not necessarily restricted to turbines although these are presently the main area of a gas turbine engine which require cooling. Again the method of the invention can be used to improve the sealing between areas of different pressure in the cooling system other than the annular areas formed between the rotor and stator described above.

I claim:

1. An improved gas turbine engine comprising a rotor, a source of cooling air at a high supply pressure, a cooling air supply arrangement for delivering cooling air from said source to said rotor, said cooling air supply arrangement including a first passage for supplying a first flow of said cooling air from said source to a first area of said rotor to be cooled, said first flow being at a first pressure lower than said high supply pressure, a second passage for supplying a second flow of said cooling air to a second area of said rotor, said second flow being at a reduced second pressure lower than said first pressure, and sealing means between said first area and said second area for resisting flow of cooling air at said first pressure from said first area to said second area, wherein the improvement comprises a part of said second passage being incorporated into said sealing means, said part of said second passage including nozzles provided in said second passage and oriented in a direction to discharge at least part of said second flow of cooling air in an upstream direction directly against leakage flow in said sealing means from said first area toward said second area to reduce such leakage flow and to simultaneously reduce pressure of said second flow of cooling air to said second area.

2. A gas turbine engine as claimed in claim 1 and in which all of said second flow of cooling air flows through said nozzles against the leakage flow in said sealing means before flow into said second area.

3. A gas turbine engine as claimed in claim 1 and in which a part of said second flow of cooling air flows through said nozzles against said leakage flow in said sealing means before flow into said second area, and including nozzle means through which a remainder of the second flow is passed directly into said second area.

4. A gas turbine engine as claimed in claim 1 and in which said nozzles include swirl means to impart a swirling motion to the cooling air in the same direction as rotation of the rotor.

5. A gas turbine engine as claimed in claims 3 or 4 in which said nozzle means through which the remainder of said second flow is passed includes swirl means to impart a swirling motion to the cooling air in the same direction as the rotation of the rotor.

6. A gas turbine engine as claimed in claims 1, 3 or 4 and in which said first passage includes swirl means arranged to impart a swirling motion to the cooling air in the same direction as the rotation of the rotor.

7. A gas turbine engine as claimed in claim 1 and in which said rotor is a turbine rotor carrying rotor blades, and the rotor blades are air-cooled by said cooling air.

8. A gas turbine engine as claimed in claim 7 and in which said second area of the rotor comprises an annular region adjacent the periphery of the rotor, and said first area of the rotor comprises an annular region immediately inside said second area.

* * * * *